US012322351B2

(12) United States Patent
Kim et al.

(10) Patent No.: US 12,322,351 B2
(45) Date of Patent: Jun. 3, 2025

(54) ELECTRONIC DEVICE AND CONTROL METHOD THEREFOR

(71) Applicant: SAMSUNG ELECTRONICS CO., LTD., Suwon-Si (KR)

(72) Inventors: Gyonyun Kim, Suwon-si (KR); Byungkwan Kim, Suwon-si (KR); Jungjin Kim, Suwon-si (KR); Youngjin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 17 days.

(21) Appl. No.: 18/372,840

(22) Filed: Sep. 26, 2023

(65) Prior Publication Data

US 2024/0021166 A1 Jan. 18, 2024

Related U.S. Application Data

(63) Continuation of application No. PCT/KR2022/005258, filed on Apr. 12, 2022.

(30) Foreign Application Priority Data

Jun. 8, 2021 (KR) ........................ 10-2021-0074005

(51) Int. Cl.
*G09G 3/34* (2006.01)
*G09G 3/20* (2006.01)

(52) U.S. Cl.
CPC ......... *G09G 3/3426* (2013.01); *G09G 3/2011* (2013.01); *G09G 3/2018* (2013.01);
(Continued)

(58) Field of Classification Search
CPC .. G09G 3/3426; G09G 3/2011; G09G 3/2018; G09G 3/2081; G09G 2320/041; G09G 2320/064; G09G 2330/021
See application file for complete search history.

(56) References Cited

U.S. PATENT DOCUMENTS

| | | | |
|---|---|---|---|
| 7,385,583 B2 | 6/2008 | Kim et al. | |
| 8,159,154 B2 | 4/2012 | Lee et al. | |

(Continued)

FOREIGN PATENT DOCUMENTS

| | | |
|---|---|---|
| CN | 103871373 B | 12/2015 |
| JP | 6037774 | 12/2016 |

(Continued)

OTHER PUBLICATIONS

European Search Report dated Jul. 23, 2024 issued in European Patent Application No. 22820390.7.

(Continued)

*Primary Examiner* — Michael J Jansen, II
(74) *Attorney, Agent, or Firm* — STAAS & HALSEY LLP

(57) ABSTRACT

An electronic device is disclosed. The electronic device includes a backlight unit including a plurality of backlights; a driving unit for driving the backlight unit; and a processor for identifying, based on luminance information about each of the plurality of backlights, a number of time intervals in which each of the plurality of backlights is to be turned on from among a plurality of time intervals included in a backlight dimming interval, and controlling the driving unit so that the plurality of backlights are turned on during the identified number of time intervals by variously changing times at which the plurality of backlights are turned on.

14 Claims, 12 Drawing Sheets

(52) U.S. Cl.
CPC ..... *G09G 3/2081* (2013.01); *G09G 2320/041* (2013.01); *G09G 2320/064* (2013.01); *G09G 2330/021* (2013.01)

(56) References Cited

U.S. PATENT DOCUMENTS

| | | | | |
|---|---|---|---|---|
| 8,670,006 | B2 | 3/2014 | Hong et al. | |
| 8,947,413 | B2 * | 2/2015 | Hotelling | G09G 3/3614 345/87 |
| 8,953,001 | B2 | 2/2015 | Kim | |
| 9,171,505 | B2 | 10/2015 | Lee et al. | |
| 9,288,403 | B2 | 3/2016 | Maeyama | |
| 9,704,428 | B2 * | 7/2017 | Mori | G09G 3/2074 |
| 9,741,312 | B2 * | 8/2017 | Fujikawa | G09G 3/3688 |
| 9,905,159 | B2 | 2/2018 | Genoe | |
| 9,959,817 | B2 * | 5/2018 | Chang | G09G 3/344 |
| 10,026,356 | B2 * | 7/2018 | Kim | G09G 3/2029 |
| 10,354,600 | B2 | 7/2019 | Min et al. | |
| 10,460,650 | B2 * | 10/2019 | Hyeon | G09G 3/32 |
| 10,515,589 | B2 * | 12/2019 | Kim | H10K 59/10 |
| 10,607,550 | B2 * | 3/2020 | Zhou | G09G 3/3258 |
| 10,902,799 | B2 | 1/2021 | Song et al. | |
| 11,069,305 | B2 * | 7/2021 | Yoshida | G09G 3/3406 |
| 11,682,343 | B2 * | 6/2023 | Cheng | G09G 3/2025 345/214 |
| 12,100,339 | B1 * | 9/2024 | Tsai | G09G 3/32 |
| 2012/0299892 | A1 * | 11/2012 | Hotelling | G09G 3/3677 345/204 |
| 2013/0063469 | A1 | 3/2013 | Ruckmongathan | |
| 2014/0152716 | A1 * | 6/2014 | Lee | G09G 3/3225 345/691 |
| 2014/0320478 | A1 | 10/2014 | Oh et al. | |
| 2014/0375622 | A1 * | 12/2014 | Nakagawa | G09G 3/3614 345/212 |
| 2015/0154926 | A1 * | 6/2015 | Fujikawa | G09G 3/3688 345/204 |
| 2015/0243207 | A1 * | 8/2015 | Kim | G09G 3/2029 345/76 |
| 2015/0325165 | A1 * | 11/2015 | Mori | G09G 3/2081 345/698 |
| 2016/0307495 | A1 * | 10/2016 | Chang | G09G 3/344 |
| 2018/0061320 | A1 * | 3/2018 | Kim | H10K 50/00 |
| 2018/0158399 | A1 * | 6/2018 | Hyeon | G09G 3/32 |
| 2019/0244572 | A1 | 8/2019 | Le et al. | |
| 2019/0279577 | A1 * | 9/2019 | Zhou | G09G 3/003 |
| 2020/0365092 | A1 * | 11/2020 | Yoshida | G09G 3/3406 |
| 2022/0343837 | A1 * | 10/2022 | Cheng | G09G 3/2025 |

FOREIGN PATENT DOCUMENTS

| | | |
|---|---|---|
| JP | 6311868 | 4/2018 |
| JP | 2020-95107 | 6/2020 |
| KR | 10-0798111 | 1/2008 |
| KR | 10-0901652 | 6/2009 |
| KR | 10-0922617 | 10/2009 |
| KR | 10-2011-0067620 | 6/2011 |
| KR | 10-2016-0007208 | 1/2016 |
| KR | 10-1581170 | 1/2016 |
| KR | 10-2017-0023307 | 3/2017 |
| KR | 10-1876940 | 7/2018 |
| KR | 10-1969959 | 4/2019 |
| KR | 10-2035755 | 11/2019 |
| KR | 10-2020-0046516 | 5/2020 |
| KR | 10-2154814 | 9/2020 |

OTHER PUBLICATIONS

International Search Report, PCT/ISA/210, dated Jun. 29, 2022, in International Application PCT/KR2022/005258.

Written Opinion, PCT/ISA/237, dated Jun. 29, 2022, in International Application PCT/KR2022/005258.

* cited by examiner

ELECTRONIC DEVICE AND CONTROL METHOD THEREFOR

CROSS-REFERENCE TO RELATED APPLICATIONS

This is a continuation application, filed under 35 U.S.C. § 111 (a), of International Application PCT/KR2022/005258, filed Apr. 12, 2022, it being further noted that foreign priority benefit is based upon Korean Patent Application No. 10-2021-0074005, filed Jun. 8, 2021, the disclosures of which are incorporated by reference herein in their entireties.

TECHNICAL FIELD

The disclosure relates to an electronic device and a control method therefor, and more particularly, to an electronic device driving a backlight unit, and a control method therefor.

DESCRIPTION OF THE RELATED ART

As electronic technologies have been developed recently, image quality of display devices is becoming further improved. In particular, as one of methods for further improving image quality, a method of increasing the number of light emitting elements included in a backlight unit is being used. As the number of light emitting elements increases, the number of pixels covered by one light emitting element decreases, and accordingly, the color sought to be expressed by each pixel can be expressed more correctly.

Control of the light amount of a backlight unit is performed by changing a current flowing in an LED. FIG. 1A illustrates an example of an LED driving circuit according to a conventional technology. Adjustment of an LED is performed through control of a constant current through active matrix (AM) driving. Here, for making a current flow in the LED, the size of a voltage (VLED) is determined in consideration of an LED forward voltage (Vf) and a voltage descent consumed in the LED.

Meanwhile, in control of a backlight unit through AM driving, a gray scale is expressed by mixing pulse width modulation (PWM) of dividing the driving time and pulse amplitude modulation (PAM) of adjusting the size thereof. For example, as illustrated in FIG. 1B, a frame may be divided into four SubFrames, and each SubFrame may be controlled per gate (line) in the order as illustrated in FIG. 1C. The light amount of the backlight unit is controlled through the value (PAM) of the SubFrames and their number (PWM).

FIG. 1D is a diagram wherein the LED is operated only in the time of the last SubFrame for expressing the backlight unit to be the darkest. That is, in each line, a current flows only in the time corresponding to No. 3 SubFrame, and a current does not flow in the remaining times.

In this case, due to a drastic change of the current flowing in the LED, excessive ripples of a voltage supplied to the LED (VLED) may be generated, and in case ripples are generated, the VLED value should be heightened for securing the Vf of the LED. Accordingly, a problem that the overall power consumption rises and the temperature rises occurs.

DETAILED DESCRIPTION OF THE INVENTION

Technical Task

The disclosure is for addressing the aforementioned need, and the purpose of the disclosure is in providing an electronic device for preventing generation of ripples of a voltage supplied to a plurality of backlights due to a drastic change of a current flowing in the plurality of backlights as the plurality of backlights are driven simultaneously, and a control method therefor.

Technical Solution

According to one or more embodiments of the disclosure for achieving the aforementioned purpose, an electronic device includes a backlight unit including a plurality of backlights, a driving unit configured to drive the backlight unit, and a processor configured to, based on luminance information of each of the plurality of backlights, identify a number of time intervals in which each of the plurality of backlights is to be turned on among a plurality of time intervals included in a backlight dimming interval, and control the driving unit so that the plurality of backlights are turned on during the identified number of time intervals by variously changing time points on which the plurality of backlights are turned on.

Also, the plurality of backlights may be arranged in a matrix form divided based on a plurality of rows and columns, and the processor may control the driving unit to shift a time point on which a first backlight among the plurality of backlights is to be turned on as much as a time interval of a first number, and shift a time point on which a second backlight arranged in a same column as the first backlight in the matrix form is to be turned on as much as a time interval of a second number.

In addition, the processor may sequentially control a plurality of backlights arranged in a same column during one time interval among the plurality of time intervals, and sequentially control the plurality of backlights arranged in the same column during a next time interval after the one time interval.

Further, the processor may variously change the time points on which the plurality of backlights are turned on based on a number of backlights that are simultaneously turned on among a plurality of backlights arranged in a same column in each of the plurality of time intervals.

Also, a voltage applied to the backlight unit may be determined based on ripples according to a number of backlights that are simultaneously turned on among the plurality of backlights.

In addition, the processor may, based on values of a plurality of first bits among a plurality of bits expressing a gray scale value of an input image, identify the number of the time intervals in which each of the plurality of backlights is to be turned on among the plurality of time intervals, and a number of the plurality of time intervals may be determined based on a number of the plurality of first bits.

Further, the processor may, based on at least one second bit which are remaining ones excluding the plurality of first bits among the plurality of bits, identify strength of a driving current corresponding to one time interval among the plurality of time intervals.

Also, the processor may include a timing controller (TCON) configured to, based on the luminance information of each of the plurality of backlights, identify the number of the time intervals in which each of the plurality of backlights is to be turned on among the plurality of time intervals, and output a control signal for controlling so that the plurality of backlights are turned on during the identified number of time intervals by variously changing the time points on which the plurality of backlights are turned on, and the driving unit may include a driver IC configured to output a driving current in an analog form based on the control signal, and a pixel IC configured to amplify the driving current output from the driver IC, and output the amplified driving current to the backlight unit.

In addition, the timing controller may output a control signal for sequentially controlling the plurality of backlights in each of the plurality of time intervals.

Further, the pixel IC may output the amplified driving current in a held state.

Meanwhile, according to one or more embodiments of the disclosure, a control method for an electronic device includes the steps of, based on luminance information of each of a plurality of backlights, identifying a number of time intervals in which each of the plurality of backlights is to be turned on among a plurality of time intervals included in a backlight dimming interval, and controlling a driving unit so that the plurality of backlights are turned on during the identified number of time intervals by variously changing time points on which the plurality of backlights are turned on.

Also, the plurality of backlights may be arranged in a matrix form divided based on a plurality of rows and columns, and in the step of controlling the driving unit, the driving unit may be controlled to shift a time point on which a first backlight among the plurality of backlights is to be turned on as much as a time interval of a first number, and shift a time point on which a second backlight arranged in a same column as the first backlight in the matrix form is to be turned on as much as a time interval of a second number.

In addition, in the step of controlling the driving unit, a plurality of backlights arranged in a same column may be sequentially controlled during one time interval among the plurality of time intervals, and the plurality of backlights arranged in the same column may be sequentially controlled during the next time interval after the one time interval.

Further, in the step of controlling the driving unit, the time points on which the plurality of backlights are turned on may be variously changed based on a number of backlights that are simultaneously turned on among a plurality of backlights arranged in a same column in each of the plurality of time intervals.

Also, a voltage applied to a backlight unit that includes the plurality of backlights may be determined based on ripples according to a number of backlights that are simultaneously turned on among the plurality of backlights.

In addition, in the step of controlling the driving unit, based on values of a plurality of first bits among a plurality of bits expressing a gray scale value of the input image, the number of the time intervals in which each of the plurality of backlights is to be turned on among the plurality of time intervals may be identified, and the number of the plurality of time intervals may be determined based on the number of the plurality of first bits.

Further, in the step of controlling the driving unit, based on at least one second bit which are the remaining ones excluding the plurality of first bits among the plurality of bits, the strength of a driving current corresponding to one time interval among the plurality of time intervals may be identified.

Also, in the step of controlling the driving unit, a timing controller (TCON) may, based on the luminance information of each of the plurality of backlights, identify the number of the time intervals in which each of the plurality of backlights is to be turned on among the plurality of time intervals, and output a control signal for controlling so that the plurality of backlights are turned on during the identified number of time intervals by variously changing the time points on which the plurality of backlights are turned on. Also, the control method may further include the steps of a driver IC outputting a driving current in an analog form based on the control signal, and a pixel IC amplifying the driving current output from the driver IC, and outputting the amplified driving current to the backlight unit.

In addition, in the step of controlling the driving unit, the timing controller may output a control signal for sequentially controlling the plurality of backlights in each of the plurality of time intervals.

Further, in the step of outputting to the backlight unit, the pixel IC may output the amplified driving current in a held state.

Effect of the Invention

According to the various embodiments of the disclosure as above, an electronic device can reduce the ripples of a voltage supplied to backlights by minimizing the number of the backlights that are simultaneously turned on in each of a plurality of time intervals included in a backlight dimming interval.

Also, as the ripples of the voltage supplied to the backlights are reduced, the voltage supplied to the backlights can be lowered, and thus the overall power consumption can be reduced, and rise of the temperature can be minimized.

MODE FOR IMPLEMENTING THE INVENTION

Hereinafter, the disclosure will be described in detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art, previous court decisions, or emergence of new technologies, etc. Also, in particular cases, there may be terms that were arbitrarily designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in this specification, expressions such as "have," "may have," "include," and "may include" denote the existence of such characteristics (e.g.: elements such as numbers, functions, operations, and components), and do not exclude the existence of additional characteristics.

In addition, the expression "at least one of A and/or B" should be interpreted to mean any one of "A" or "B" or "A and B."

Further, the expressions "first," "second," and the like used in this specification may be used to describe various elements regardless of any order and/or degree of importance. Also, such expressions are used only to distinguish one element from another element, and are not intended to limit the elements.

Also, singular expressions include plural expressions, unless defined obviously differently in the context. In addition, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Further, in this specification, the term "user" may refer to a person who uses an electronic device or a device using an electronic device (e.g.: an artificial intelligence electronic device).

Hereinafter, various embodiments of the disclosure will be described in more detail with reference to the accompanying drawings.

Figure 2:
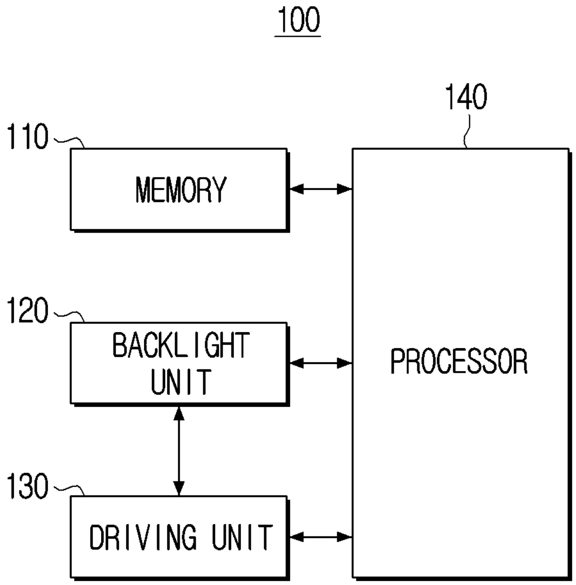
FIG. 2 is a block diagram illustrating a configuration of an electronic device according to one or more embodiments of the disclosure.

FIG. 2 is a block diagram illustrating a configuration of an electronic device 100 according to one or more embodiments of the disclosure.

The electronic device 100 is a device controlling a backlight unit 120, and it may be a device that is equipped with a display panel, and directly displays an acquired graphic image such as a TV, a desktop PC, a laptop computer, a video wall, a large format display (LFD), digital signage, a digital information display (DID), a projector display, a digital video disk (DVD) player, a smartphone, a tablet PC, a monitor, smart glasses, a smart watch, etc.

However, the disclosure is not limited thereto, and the electronic device 100 may also be implemented as a device that is attached to/detached from the display panel, and it can be any device if it is a device that can control the backlight unit 120.

The electronic device 100 includes a memory 110, a backlight unit 120, a driving unit 130, and a processor 140, as illustrated in FIG. 2.

The memory 110 may refer to hardware that stores information such as data, etc. in an electronic or a magnetic form so that the processor 140, etc. can access the information. For this, the memory 110 may be implemented as at least one hardware among a non-volatile memory, a volatile memory, a flash memory, a hard disk drive (HDD) or a solid state drive (SSD), a RAM, a ROM, etc.

In the memory 110, at least one instruction or module necessary for the operations of the electronic device 100 or the processor 140 may be stored. Here, an instruction is a code unit instructing the operation of the electronic device 100 or the processor 140, and it may have been drafted in a machine language which is a language that can be understood by a computer. A module may be a set of a series of instructions (an instruction set) that performs a specific job in a job unit.

In the memory 110, data which is information in bit or byte units that can express characters, numbers, images, etc. may be stored. For example, in the memory 110, information on an input image may be stored.

The memory 110 may be accessed by the processor 140, and reading/recording/correction/deletion/update, etc. for an instruction, a module, or data may be performed by the processor 140.

The backlight unit 120 is a component that generates a light and provides it to the display panel. For this, the backlight unit 120 may include at least one light emitting element (not shown), and also, it may be arranged on the rear surface of the display panel and irradiate a light to the display panel so that the display panel can display an image.

The light emitting element (not shown) may emit a light as a light source. Also, the light emitting element (not shown) may be implemented as a light emitting diode (LED), and receive a current output by the driving unit 130 and emit a light.

The driving unit 130 may output a driving current to the backlight unit 120 according to control by the processor 140. For example, the driving current may be in a form wherein a pulse width modulation (PWM) form and a pulse amplitude modulation (PAM) form are mixed. However, the disclosure is not limited thereto, and the driving current may be in a PWM form.

The processor 140 controls the overall operations of the electronic device 100. Specifically, the processor 140 may be connected with each component of the electronic device 100, and control the overall operations of the electronic device 100. For example, the processor 140 may be connected with components such as a memory 110, a backlight unit 120, a driving unit 130, etc., and control the operations of the electronic device 100.

According to one or more embodiments, the processor 140 may be implemented as a digital signal processor (DSP), a microprocessor, and a timing controller (TCON). However, the disclosure is not limited thereto, and the processor 140 may include one or more of a central processing unit (CPU), a micro controller unit (MCU), a micro processing unit (MPU), a controller, an application processor (AP), or a communication processor (CP), and an ARM processor, or may be defined by the terms. Also, the processor 140 may be implemented as a system on chip (SoC) having a processing algorithm stored therein or large scale integration (LSI), or implemented in the form of a field programmable gate array (FPGA).

The processor 140 may identify the number of time intervals in which each of a plurality of backlights is to be turned on among a plurality of time intervals included in a backlight dimming interval based on luminance information of each of the plurality of backlights.

Here, the plurality of backlights may be arranged in a matrix form divided based on a plurality of rows and columns.

The backlight dimming interval is a time interval for expressing one frame, and the processor 140 may identify the backlight dimming interval as a plurality of time intervals based on a gray scale value of an input image. For example, the processor 140 may divide the backlight dimming interval into eight time intervals based on a gray scale value of an input image. The processor 140 may perform pulse width modulation (PWM) control of seven time intervals, and perform pulse amplitude modulation (PAM) control of one time interval. Alternatively, the processor 140 may perform pulse width modulation (PWM) control of the eight time intervals. All of each time interval may be the same time. Hereinafter, it will be assumed that the processor 140 performs PWM and PAM control.

The processor 140 may identify the number of the time intervals in which each of the plurality of backlights is to be turned on among the plurality of time intervals based on values of a plurality of first bits among a plurality of bits expressing a gray scale value of the input image. Also, the number of the plurality of time intervals may be determined based on the number of the plurality of first bits. Then, the processor 140 may identify the strength of a driving current corresponding to one time interval among the plurality of time intervals based on at least one second bit which are the remaining ones excluding the plurality of first bits among the plurality of bits.

For example, in case a gray scale value of an input image is expressed as five bits, the processor 140 may use three bits among the five bits as the first bit. The processor 140 may identify a time interval to which a current will be applied among the plurality of time intervals based on the value of the first bit. Then, the processor 140 may identify two bits which are the remaining ones among the five bits as the second bit, and control the driving unit 130 to change the size of the current of one time interval among the plurality of time intervals based on the remaining two bits. Here, the number of the plurality of time intervals may be the multiplier of the number of the plurality of first bits for 2. For example, the number of the plurality of time intervals may be eight, which is 2 to the third. That is, the processor 140 may identify a time interval to which a current will flow based on the value of the three bits among the eight time intervals. However, the disclosure is not limited thereto, and the bit number of a gray scale value of an input image, the number of the first bit, and the number of the second bit may be any different numbers.

The processor 140 may sequentially control a plurality of backlights arranged in the same column during one time interval among the plurality of time intervals, and sequentially control the plurality of backlights arranged in the same column during the time interval next to the one time interval. For example, the processor 140 may sequentially control a plurality of backlights arranged in the first column during the first time interval, and sequentially control the plurality of backlights arranged in the first column during the second time interval which is next to the first time interval. By such a method, the processor 140 may control the plurality of backlights during the plurality of time intervals, and then sequentially control the plurality of backlights arranged in the second column next to the first column. That is, one backlight may be controlled as much as the number of the plurality of time intervals during one frame.

The processor 140 may control the driving unit 130 so that the plurality of backlights are turned on during the identified number of time intervals by variously changing the times at which the plurality of backlights are turned on. For example, the processor 140 may control the driving unit 130 to shift a time point on which a first backlight among the plurality of backlights is to be turned on as much as a time interval of a first number, and shift a time point on which a second backlight arranged in the same column as the first backlight in the matrix form is to be turned on as much as a time interval of a second number.

The number of the time intervals that are shifted may be determined by various methods. For example, the number of the time intervals that are shifted regarding each of the plurality of backlights may be predetermined, or determined according to a user instruction. Alternatively, the processor 140 may control the driving unit 130 to variously change the time points on which each of the plurality of backlights is to be turned on for each of the plurality of backlights based on the number of backlights that are simultaneously turned on among a plurality of backlights arranged in the same column in each of the plurality of time intervals.

For explaining the method for controlling a backlight according to the disclosure in more detail, a case wherein a first backlight and a second backlight exist, and only one time interval among the plurality of time intervals of the backlight dimming interval is turned on will be explained. In this case, according to the conventional technology, the first backlight and the second backlight may be turned on during the same time interval. In contrast, according to the disclosure, the processor 140 may control the times on which the first backlight and the second backlight are turned on differently. For example, in the case of turning on the first backlight during the last time interval among the plurality of time intervals, the processor 140 may turn on the second backlight during the time interval that is second to the last among the plurality of time intervals.

Through such an operation, the processor 140 can minimize a phenomenon wherein the plurality of backlights are simultaneously turned on, and reduce ripples of a voltage (VLED) applied to the backlight unit 120. The voltage applied to the backlight unit 120 may be determined based on ripples according to the number of the backlights that are simultaneously turned on among the plurality of backlights. In case ripples are reduced, the size of the voltage (VLED) applied to the backlight unit 120 can be reduced, and accordingly, the overall power consumption can be reduced, and rise of the temperature can be minimized.

Meanwhile, the processor 140 may control whether to perform a shifting operation based on an input image. For example, if it is identified that an input image is an advertising content, the processor 140 may control the plurality of backlights as in the conventional technology, and if it is identified that an input image is a movie content, the processor 140 may control the plurality of backlights as in the disclosure. Alternatively, the processor 140 may control whether to perform a shifting operation for each scene of an input image. Alternatively, if change of luminance is greater than or equal to a threshold value in a process wherein a scene of an input image is changed, the processor 140 may control the plurality of backlight as in the disclosure.

Meanwhile, the processor 140 may include a timing controller (TCON) that is configured to, based on the luminance information of each of the plurality of backlights, identify the number of the time intervals in which each of the plurality of backlights is to be turned on among the plurality of time intervals, and control so that the plurality of backlights are turned on during the identified number of time intervals by variously changing the time points on which the plurality of backlights are turned on.

Here, the timing controller may output a control signal for sequentially controlling the plurality of backlights in each of the plurality of time intervals.

Also, the driving unit 130 may amplify a driver IC configured to output a driving current in an analog form based on the control signal, and a pixel IC configured to amplify the driving current output from the driver IC, and output the amplified driving current to the backlight unit 120. Here, the pixel IC may output the amplified driving current in a held state.

However, the disclosure is not limited thereto, and the timing controller may be included in the driving unit 130, or implemented as one hardware with the timing controller of the display panel.

As described above, the processor 140 can reduce the ripples of a voltage supplied to the backlights by minimizing the number of backlights that are simultaneously turned on in each of the plurality of time intervals included in the backlight dimming interval. Accordingly, the voltage supplied to the backlights can be lowered, and thus the overall power consumption can be reduced, and rise of the temperature can be minimized.

Meanwhile, in the above, an example of controlling the first backlight and the second backlight was suggested, but the disclosure is not limited thereto. For example, the processor 140 may control the plurality of backlights arranged in the same column. In this case, the processor 140 may change the time intervals wherein the plurality of backlights are turned on so that cases wherein the plurality of backlights arranged in the same column are simultaneously turned on are reduced.

Also, in the above, it was assumed that a gray scale value of an input image is five bits, but the bit number may be implemented as any various bit numbers. In addition, in the above, it was explained that three bits among the gray scale value five bits of the input image are the first bit, and two bits are the second bit, but it may also be changed in any various ways according to the specification required when implementing the electronic device 100.

Hereinafter, operations of the electronic device 100 will be described in more detail through FIG. 3 to FIG. 8. In FIG. 3 to FIG. 8, individual embodiments will be explained for the convenience of explanation. However, the individual embodiments in FIG. 3 to FIG. 8 may also be implemented in any combined states.

Figure 3:
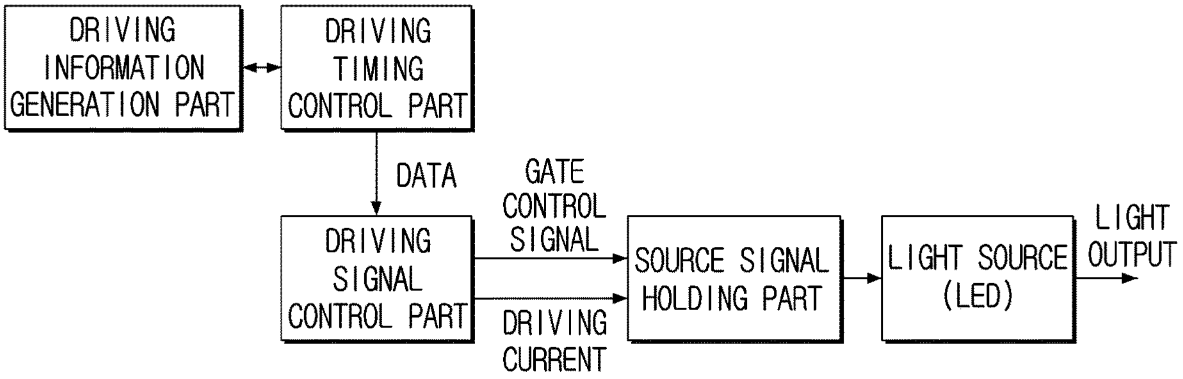
FIG. 3 is a block diagram for illustrating in detail a configuration of an electronic device according to one or more embodiments of the disclosure.

FIG. 3 is a block diagram for illustrating in detail a configuration of the electronic device 100 according to one or more embodiments of the disclosure.

The processor 140 may include a driving information generation part and a driving timing control part (a timing controller, TCON). The driving information generation part may generate driving information for controlling the driving unit 130 based on a gray scale value of an input image, and the driving timing control part may output digital data for controlling the driving unit 130 based on the driving information. The driving information generation part and the driving timing control part may be implemented as field programmable gate arrays (FPGAs).

The driving timing control part according to the disclosure may identify the number of time intervals in which each of the plurality of backlights is to be turned on among the plurality of time intervals included in the backlight dimming interval based on luminance information of each of the plurality of backlights, and output a control signal controlling so that the plurality of backlights are turned on during the identified number of time intervals by variously changing the time points on which the plurality of backlights are turned on. Here, the control signal may be output as digital data.

In particular, the timing control part may identify the number of backlights that are turned on during the same time interval among a plurality of backlights arranged in the same column in one frame, and output digital data so that the number of the backlights turned on in the same time interval becomes minimum.

That is, the driving information generation part may generate driving information as in the conventional technology, but the driving timing control part may change the time intervals in which each backlight is to be turned on based on the driving information.

However, the disclosure is not limited thereto, and the driving information generation part may generate driving information as in the disclosure. For example, the driving information generation part may identify time intervals in which each of the plurality of backlights is to be turned on, and then generate driving information so that the number of the backlights turned on in the same time interval becomes minimum. In this case, the driving timing control part may output digital data corresponding to the driving information without identifying time intervals in which each backlight is turned on.

The driving signal control part is also referred to as a driver IC, and it may provide a gate control signal and a driving current to a source signal holding part. Here, each of the plurality of driver ICs may output a driving current in an analog form corresponding to each of the plurality of pixel ICs based on the digital data.

The source signal holding part is also referred to as a pixel IC, and may amplify a driving current output from a corresponding driver IC, and output the amplified driving current to the backlight unit (a light source (LED), 120). Also, the source signal holding part may output the amplified driving current in a held state.

Figure 4:
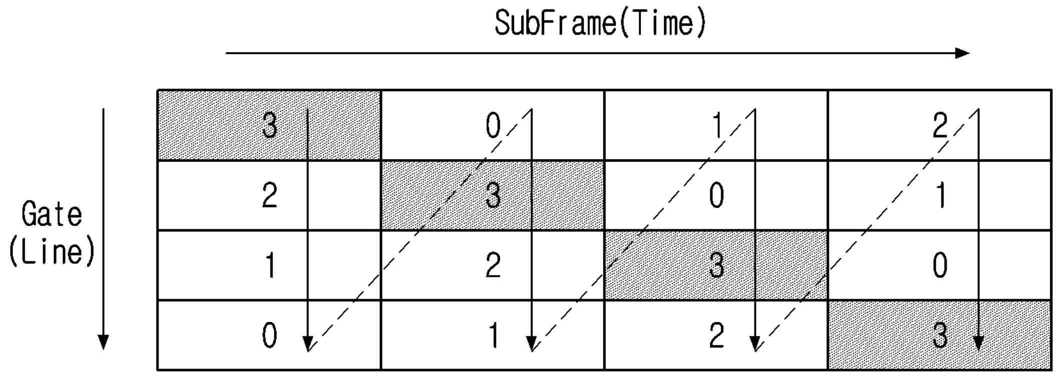
FIG. 4 is a diagram for illustrating a driving method of a plurality of backlights according to one or more embodiments of the disclosure.

FIG. 4 is a diagram for illustrating a driving method of a plurality of backlights according to one or more embodiments of the disclosure.

Prior to explaining FIG. 4, the plurality of time intervals in the first row in FIG. 4 will be explained first. FIG. 4 assumed a case of PWM and PAM driving, and assumed that a gray scale value of an input image is four bits, and the upper two bits are the first bit, and the lower two bits are the second bit, for the convenience of explanation.

That is, based on two first bits, the plurality of time intervals may be four time intervals. Also, the size of the current in the last one time interval may vary based on two second bits.

However, the disclosure is not limited thereto, and the disclosure may be applied in the case of PWM driving without PAM, and in this case, FIG. 4 may be a case wherein a gray scale value of an input image is two bits. That is, based on the value of two bits, the time interval in which the backlights are to be turned on may be determined among the four time intervals.

Figure 1A:
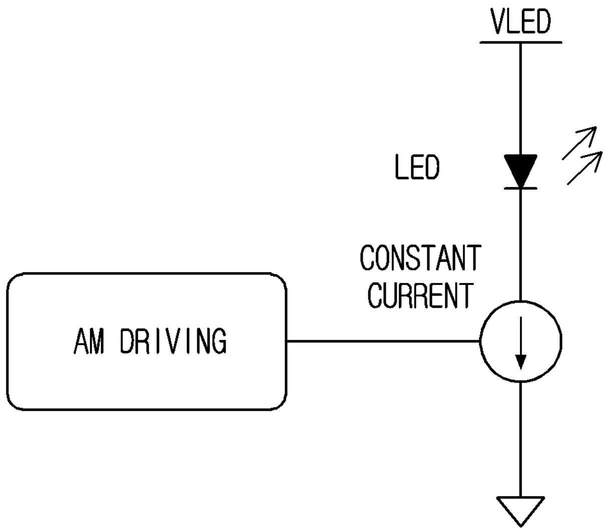
FIG. 1A to FIG. 1D are diagrams for illustrating a conventional technology.
Figure 1B:
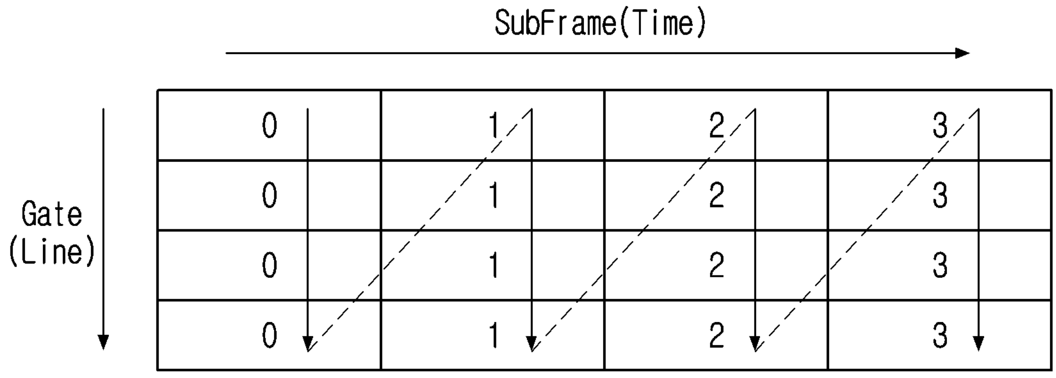
Figure 1C:
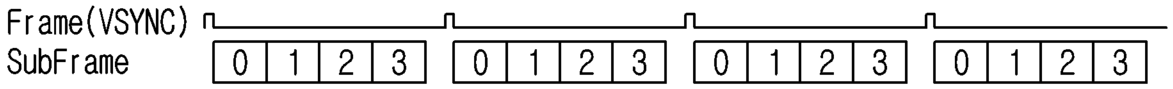
Figure 1D:
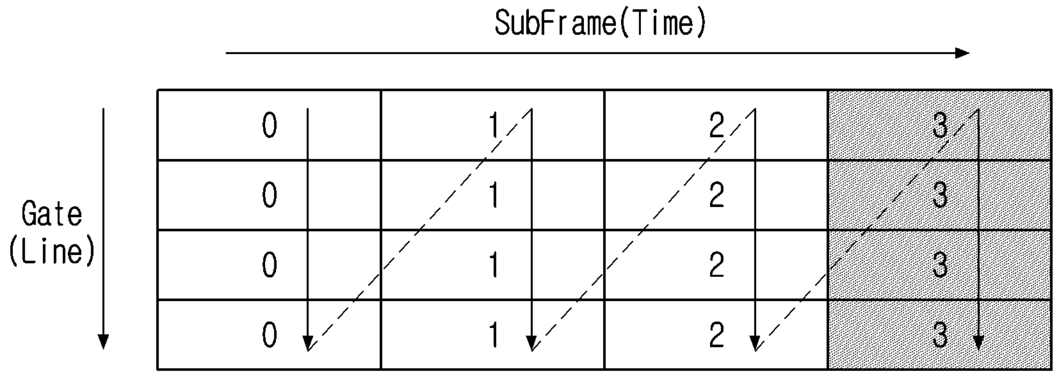

Hereinafter, a turn-on operation of the backlights will be explained, and in addition, a case wherein the same input image as in FIG. 1D was input was assumed, for the convenience of explanation. By the conventional technology, four backlights may be turned on in the fourth time interval as in FIG. 1D.

In contrast, according to the disclosure, the processor 140 may control the driving unit 130 to turn on the first backlight in the first time interval by shifting three time intervals, turn on the second backlight in the second time interval by shifting two time intervals, turn on the third backlight in the third time interval by shifting one time interval, and turn on the fourth backlight in the fourth time interval without shifting. Here, the shifting degree of each backlight may be in a predetermined state.

That is, the processor 140 may use a method of shifting the operation times based on the location of each backlight.

However, the disclosure is not limited thereto, and the processor 140 may control the driving unit 130 to turn on the first backlight in the fourth time interval, turn on the second backlight in the third time interval, turn on the third backlight in the second time interval, and turn on the fourth backlight in the first time interval.

Alternatively, the processor 140 may analyze an input image, and shift a turn-on point so that the number of backlights that are simultaneously turned on during one time interval is minimized.

Figure 5:
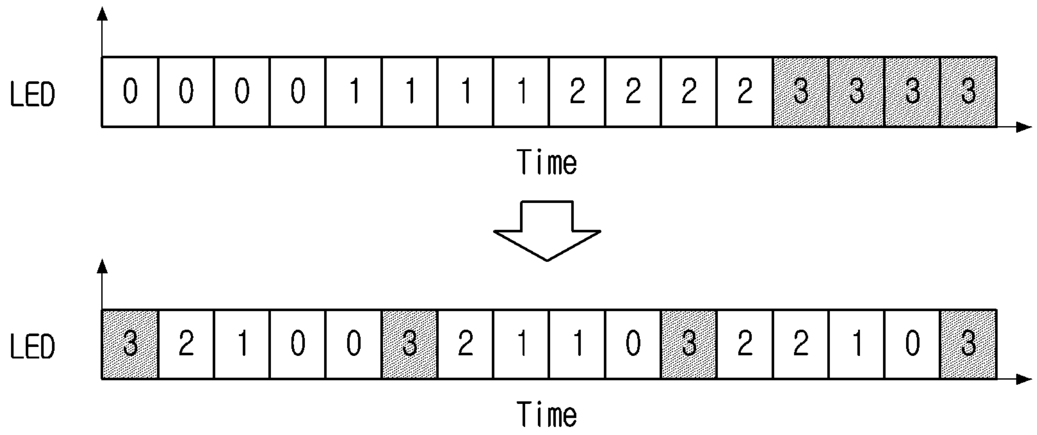
FIG. 5 is a diagram for illustrating driving timing of a plurality of backlights according to one or more embodiments of the disclosure.

FIG. 5 is a diagram for illustrating driving timing of a plurality of backlights according to one or more embodiments of the disclosure.

For the convenience of explanation, FIG. 5 assumed that the plurality of backlights are driven as in FIG. 4.

First, the upper part of FIG. 5 describes the driving timing of the plurality of backlights according to the conventional technology, and according to the conventional technology, the first backlight to the fourth backlight are turned off during the first time interval, and the first backlight to the fourth backlight are also turned off during the second time interval and the third time interval, and the first backlight to the fourth backlight are turned on during the fourth time interval.

In contrast, according to the disclosure, as in the lower part of FIG. 5, the first backlight may be turned on and the remaining backlights may be turned off during the first time interval, and the first backlight may be turned off and the second backlight may be turned on and the remaining backlights may be turned off during the second time interval, and the first backlight and the second backlight may be turned off, and the third backlight may be turned on and the fourth backlight may be turned off during the third time interval, and the first backlight to the third backlight may be turned off and the fourth backlight may be turned on during the fourth time interval.

The actual driving of the backlights is carried out in a very short time. That is, driving of four backlights during one time interval may seem almost identical time points from the user's viewpoint. Accordingly, in a case as in the upper part of FIG. 5, turn-on of the first backlight to the fourth backlight during the fourth time interval may seem to be almost simultaneous, and in this case, as the four backlights are turned on almost simultaneously, ripples of a voltage supplied to the backlights may become bigger.

In contrast, in a case as in the lower part of FIG. 5, there is merely one backlight that is turned on for each time interval, and the ripples of a voltage supplied to the backlights may become smaller than in the upper part of FIG. 5. Accordingly, a voltage supplied to the backlights can be lowered, and thus the overall power consumption can be reduced, and rise of the temperature can be minimized.

Figure 6:
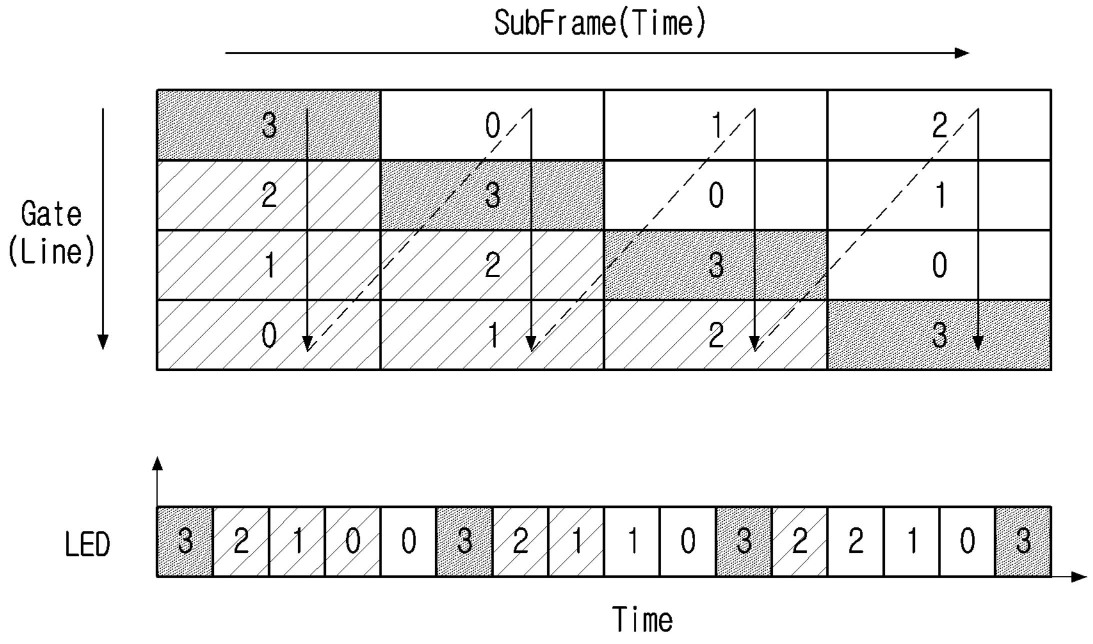
FIG. 6 is a diagram for illustrating driving timing of an LCD according to one or more embodiments of the disclosure.

FIG. 6 is a diagram for illustrating driving timing of an LCD according to one or more embodiments of the disclosure.

In FIG. 6, a method by which operation time of each backlight is shifted is assumed, for the convenience of explanation.

The processor 140 may drive the LCD based on the method by which each backlight is shifted. Specifically, in FIG. 6, the part indicated by the oblique line in the lower left part indicates a time interval wherein data of the previous frame is displayed, and the diagonal line indicates a starting interval wherein the data of the current frame is displayed according to turn-on of each backlight.

That is, if the control time of each backlight is changed, the processor 140 may change the driving timing of the LCD to correspond to the changed control time.

Figure 7:
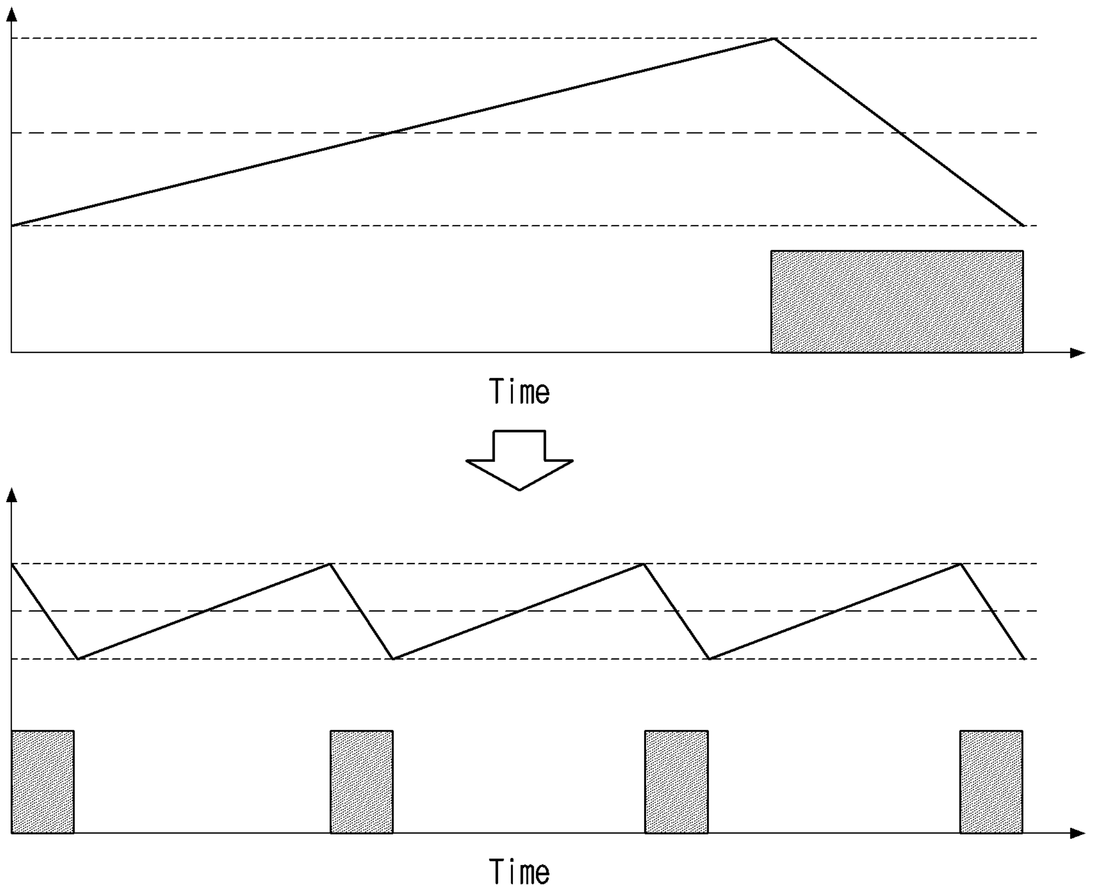
FIG. 7 is a diagram for illustrating an effect that ripples are reduced according to one or more embodiments of the disclosure.

FIG. 7 is a diagram for illustrating an effect that ripples are reduced according to one or more embodiments of the disclosure.

In the upper part of FIG. 7, the straight line graph indicates a voltage applied to the backlight unit 120, and the shaded part in the upper part of FIG. 7 indicates a state wherein the plurality of backlights are turned on according to the conventional technology as in the upper part of FIG. 5. That is, if all of the plurality of backlights are turned on during one time interval, the voltage may be changed as in the straight line graph in the upper part of FIG. 7, and the difference between the highest point and the lowest point in the straight line graph indicates ripples.

Meanwhile, in the lower part of FIG. 7, the straight line graph indicates a voltage applied to the backlight unit 120, and the shaded part in the lower part of FIG. 7 indicates a state wherein each of the plurality of backlights is turned on according to the disclosure as in the lower part of FIG. 5. That is, if each of the plurality of backlights is sequentially turned on in the plurality of time intervals, the voltage may be changed as in the straight line graph in the lower part of FIG. 7, and the difference between the highest point and the lowest point in the straight line graph indicates ripples.

As the plurality of backlights are turned on with time intervals, the ripples in the lower part of FIG. 7 may become smaller than the ripples in the upper part of FIG. 7, and a design wherein the voltage applied to the backlight unit 120 is reduced more than in the conventional technology becomes possible. Accordingly, the overall power consumption can be reduced, and rise of the temperature can be minimized.

Figure 8:
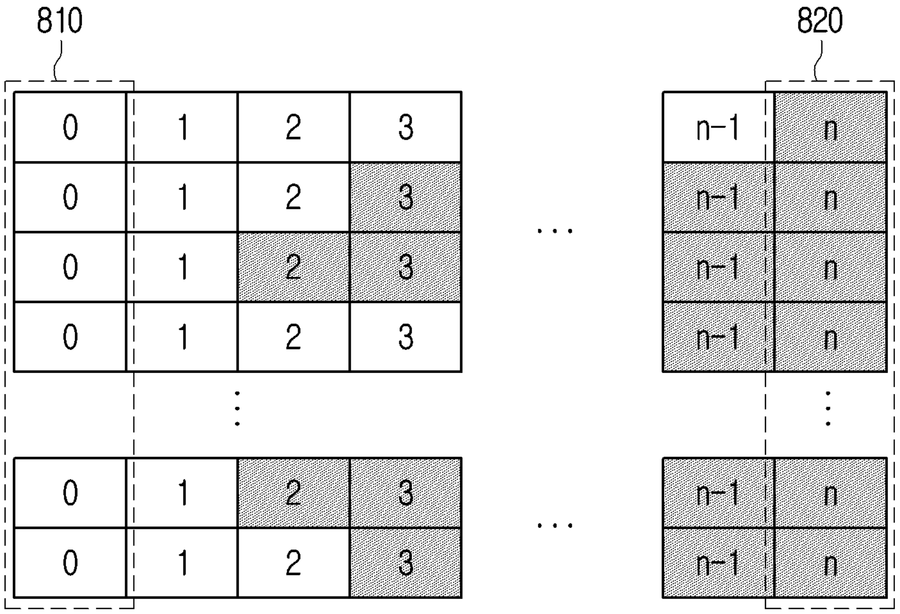
FIG. 8 is a diagram for illustrating a driving method of a plurality of backlights according to an extended embodiment of the disclosure.

FIG. 8 is a diagram for illustrating a driving method of a plurality of backlights according to an extended embodiment of the disclosure.

In the above, for the convenience of explanation, it was assumed that there are four backlights, and there are also four time intervals. Also, it was assumed that the backlights are turned on during the last time interval among the plurality of time intervals.

However, the disclosure is not limited thereto, and at least one of the number of the backlights, the number of the time intervals, or the time intervals in which the backlights are turned on may be various in numerous ways. For example, as in FIG. 8, the number of the backlights may be more than four, and the time interval may be n+1 (here, n is an integer). Also, the time intervals in which the backlights are turned on may vary for each backlight.

In this case, the processor 140 may identify the numbers of backlights that are turned on in each time interval. For example, the processor 140 may identify the number of backlights that are turned on in the first time interval 810, identify the number of backlights that are turned on in each time interval by the same method, and identify the number of backlights that are turned on in the last time interval 820.

Also, the processor 140 may change the time points on which the plurality of backlights are turned on so that the number of the backlights that are simultaneously turned on in each of the plurality of time intervals is minimized. Here, various optimization methods may be used. For example, the processor 140 may change the time points on which the plurality of backlights are turned on through optimization methods such as dynamic programming, a genetic algorithm, etc. However, the disclosure is not limited thereto, and the processor 140 may also change the time points on which the plurality of backlights are turned on by any various methods. In particular, methods which are not shifting may be used.

Figure 9:
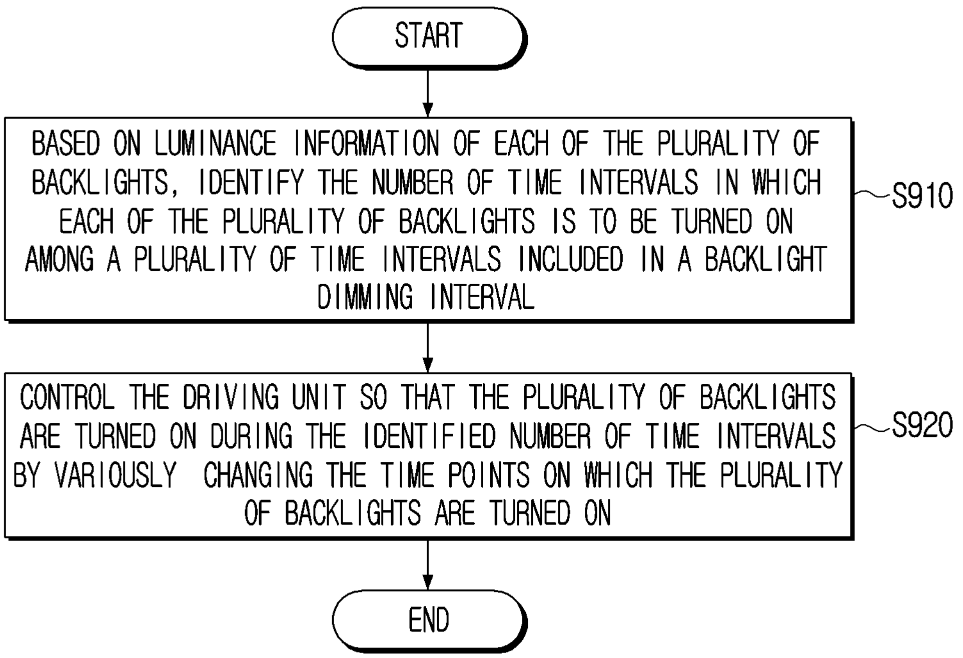
FIG. 9 is a flow chart for illustrating a control method for an electronic device according to one or more embodiments of the disclosure.

FIG. 9 is a flow chart for illustrating a control method for an electronic device according to one or more embodiments of the disclosure.

First, based on luminance information of each of the plurality of backlights, the number of time intervals in which each of the plurality of backlights is to be turned on among a plurality of time intervals included in a backlight dimming interval is identified in operation S910. Then, the driving unit is controlled so that the plurality of backlights are turned on during the identified number of time intervals by variously changing the time points on which the plurality of backlights are turned on in operation S920.

Here, the plurality of backlights are arranged in a matrix form divided based on a plurality of rows and columns, and in the operation S920 of controlling the driving unit, the driving unit 130 may be controlled to shift a time point on which a first backlight among the plurality of backlights is to be turned on as much as a time interval of a first number, and to shift a time point on which a second backlight arranged in the same column as the first backlight in the matrix form is to be turned on as much as a time interval of a second number.

Also, in the operation S920 of controlling the driving unit, a plurality of backlights arranged in the same column during one time interval among the plurality of time intervals may be sequentially controlled, and the plurality of backlights arranged in the same column during the next time interval after the one time interval may be sequentially controlled.

Meanwhile, in the operation S920 of controlling the driving unit, the time points on which the plurality of backlights are turned on may be variously changed based on the number of backlights that are simultaneously turned on among a plurality of backlights arranged in the same column in each of the plurality of time intervals.

Also, a voltage applied to the backlight unit may be determined based on ripples according to the number of backlights that are simultaneously turned on among the plurality of backlights.

Meanwhile, in the operation S920 of controlling the driving unit, based on values of a plurality of first bits among a plurality of bits expressing a gray scale value of the input image, the number of the time intervals in which each of the plurality of backlights is to be turned on among the plurality of time intervals may be identified, and the number of the plurality of time intervals may be determined based on the number of the plurality of first bits.

Also, in the operation S920 of controlling the driving unit, based on at least one second bit which are the remaining ones excluding the plurality of first bits among the plurality of bits, the strength of a driving current corresponding to one time interval among the plurality of time intervals may be identified.

Meanwhile, in the operation S920 of controlling the driving unit, a timing controller (TCON) may, based on the luminance information of each of the plurality of backlights, identify the number of the time intervals in which each of the plurality of backlights is to be turned on among the plurality of time intervals, and output a control signal for controlling so that the plurality of backlights are turned on during the identified number of time intervals by variously changing the time points on which the plurality of backlights are turned on, and the control method may further include the step of a driver IC of outputting a driving current in an analog form based on the control signal, and the step of a pixel IC of amplifying the driving current output from the driver IC, and outputting the amplified driving current to the backlight unit.

Here, in the operation S920 of controlling the driving unit, the timing controller may output a control signal for sequentially controlling the plurality of backlights in each of the plurality of time intervals.

Also, in the operation of outputting to the backlight unit, the pixel IC may output the amplified driving current in a held state.

According to the various embodiments of the disclosure as above, an electronic device can minimize the number of backlights that are simultaneously turned on in each of the plurality of time intervals included in the backlight dimming interval, and can thereby reduce ripples of a voltage applied to the backlights.

Also, as the ripples of the voltage applied to the backlights are reduced, the voltage supplied to the backlights can be lowered, and thus the overall power consumption can be reduced, and rise of the temperature can be minimized.

Meanwhile, according to one or more embodiments of the disclosure, the various embodiments described above may be implemented as software including instructions stored in machine-readable storage media, which can be read by machines (e.g.: computers). Here, the machines refer to devices that call instructions stored in a storage medium, and can operate according to the called instructions, and the devices may include an electronic device according to the aforementioned embodiments (e.g.: an electronic device A). In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to one or more embodiments of the disclosure, methods according to the various embodiments disclosed above may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or distributed on-line through an application store (e.g.: Play Store), or between two user apparatuses (e.g.: smartphones). In the case of on-line distribution, at least a portion of a computer program product may be stored in a storage medium readable by machines such as the server of the manufacturer, the server of the application store, and the memory of the relay server at least temporarily, or may be generated temporarily.

In addition, according to one or more embodiments of the disclosure, the various embodiments disclosed above may be implemented in a recording medium that can be read by a computer or a device similar to a computer, by using software, hardware, or a combination thereof. In some cases, the embodiments described in this specification may be implemented as a processor itself. According to implementation by software, the embodiments such as processes and functions described in this specification may be implemented by separate software modules. Each of the software modules can perform one or more functions and operations described in this specification.

Meanwhile, computer instructions for performing processing operations of machines according to the various embodiments described above may be stored in a non-transitory computer-readable medium. Computer instructions stored in such a non-transitory computer-readable medium make the processing operations at machines according to the various embodiments described above performed by a specific machine, when the instructions are executed by the processor of the specific machine. A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disc, a blue-ray disc, a USB, a memory card, a ROM and the like.

Also, each of the components (e.g.: a module or a program) according to the various embodiments described above may consist of a singular object or a plurality of objects. Further, among the aforementioned corresponding sub components, some sub components may be omitted, or other sub components may be further included in the various embodiments. Alternatively or additionally, some components (e.g.: a module or a program) may be integrated as an object, and perform functions performed by each of the components before integration identically or in a similar manner. In addition, operations performed by a module, a program, or other components according to the various embodiments may be executed sequentially, in parallel, repetitively, or heuristically. Or, at least some of the operations may be executed in a different order or omitted, or other operations may be added.

Also, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. An electronic device comprising:

a backlight unit including a plurality of backlights;

a driving unit configured to drive the backlight unit; and a processor configured to:

based on a number of a plurality of first bits among a plurality of bits expressing a gray scale of an input image, determine a number of a plurality of time intervals included in a backlight dimming interval, based on values of the plurality of first bits, identify a number of time intervals in which each of the plurality of backlights is to be turned on among the plurality of time intervals, and control the driving unit so that the plurality of backlights are turned on during the identified number of time intervals by variously changing time points on which the plurality of backlights are turned on.

2. The electronic device of claim 1, wherein the plurality of backlights are arranged in a matrix form divided based on a plurality of rows and columns, and the processor is configured to:

control the driving unit to shift a time point on which a first backlight among the plurality of backlights is to be turned on as much as a time interval of a first number, and shift a time point on which a second backlight arranged in a same column as the first backlight in the matrix form is to be turned on as much as a time interval of a second number.

3. The electronic device of claim 2, wherein the processor is configured to:

sequentially control a plurality of backlights arranged in a same column during one time interval among the plurality of time intervals, and sequentially control the plurality of backlights arranged in the same column during a next time interval after the one time interval.

4. The electronic device of claim 2, wherein the processor is configured to:

variously change the time points on which the plurality of backlights are turned on based on a number of backlights that are simultaneously turned on among a plurality of backlights arranged in a same column in each of the plurality of time intervals.

5. The electronic device of claim 1, wherein a voltage applied to the backlight unit is determined based on ripples according to a number of backlights that are simultaneously turned on among the plurality of backlights.

6. The electronic device of claim 1, wherein the processor is configured to:

based on at least one second bit which are remaining ones excluding the plurality of first bits among the plurality of bits, identify strength of a driving current corresponding to one time interval among the plurality of time intervals.

7. The electronic device of claim 1, wherein the processor comprises:

a timing controller (TCON) configured to, based on the luminance information of each of the plurality of backlights, identify the number of the time intervals in which each of the plurality of backlights is to be turned on among the plurality of time intervals, and output a control signal for controlling so that the plurality of backlights are turned on during the identified number of time intervals by variously changing the time points on which the plurality of backlights are turned on, and the driving unit comprises:

a driver IC configured to output a driving current in an analog form based on the control signal, and a pixel IC configured to amplify the driving current output from the driver IC, and output the amplified driving current to the backlight unit.

8. The electronic device of claim 7, wherein the timing controller is configured to:

output a control signal for sequentially controlling the plurality of backlights in each of the plurality of time intervals.

9. The electronic device of claim 7, wherein the pixel IC is configured to:

output the amplified driving current in a held state.

10. A control method for an electronic device, the control method comprising:

based on a number of a plurality of first bits among a plurality of bits expressing a gray scale of an input image, determine a number of a plurality of time intervals included in a backlight dimming interval, based on values of the plurality of first bits, identifying a number of time intervals in which each of the plurality of backlights is to be turned on among the plurality of time intervals; and controlling a driving unit so that the plurality of backlights are turned on during the identified number of time intervals by variously changing time points on which the plurality of backlights are turned on.

11. The control method of claim 10, wherein the plurality of backlights are arranged in a matrix form divided based on a plurality of rows and columns, and the controlling the driving unit comprises:

controlling the driving unit to shift a time point on which a first backlight among the plurality of backlights is to be turned on as much as a time interval of a first number, and shift a time point on which a second backlight arranged in a same column as the first backlight in the matrix form is to be turned on as much as a time interval of a second number.

12. The control method of claim 11, wherein the controlling the driving unit comprises:

sequentially controlling a plurality of backlights arranged in a same column during one time interval among the plurality of time intervals; and sequentially controlling the plurality of backlights arranged in the same column during a next time interval after the one time interval.

13. The control method of claim 11, wherein the controlling the driving unit comprises:

variously changing the time points on which the plurality of backlights are turned on based on a number of backlights that are simultaneously turned on among a plurality of backlights arranged in a same column in each of the plurality of time intervals.

14. The control method of claim 10, wherein a voltage applied to a backlight unit including the plurality of backlights is determined based on ripples according to a number of backlights that are simultaneously turned on among the plurality of backlights.

* * * * *